United States Patent [19]
Heess et al.

[11] Patent Number: 4,709,969
[45] Date of Patent: Dec. 1, 1987

[54] BRAKE PRESSURE BOOSTER IN VEHICLE BRAKE SYSTEMS

[75] Inventors: Gerhard Heess, Tamm; Anton van Zanten, Ditzingen, both of Fed. Rep. of Germany

[73] Assignee: Robert Bosch GmbH, Stuttgart, Fed. Rep. of Germany

[21] Appl. No.: 887,302

[22] Filed: Jul. 23, 1986

[30] Foreign Application Priority Data

Jul. 23, 1985 [DE] Fed. Rep. of Germany ....... 3526192

[51] Int. Cl.⁴ .......................... B60T 8/32; B60T 13/74
[52] U.S. Cl. ...................................... 303/114; 60/545; 303/113; 303/119
[58] Field of Search ................. 60/545, 579; 335/184, 335/219; 92/84, 109; 303/2–4, 15, 91, 7, 113–119, 20, DIG. 5; 188/152, 72.4, 158–165, 216; 251/129.01–129.22

[56] References Cited

U.S. PATENT DOCUMENTS 3,350,142 10/1967 Schuman ................................. 303/7
3,486,799 12/1969 Greentree ............................... 303/7
3,690,736 9/1972 Smirl et al. ........................ 303/61 X
3,731,979 5/1973 Mikaila ................................ 303/116
3,790,807 2/1974 Rossigno ......................... 188/152 X
3,823,985 7/1974 Hubbard ........................... 303/15 X
4,275,934 6/1981 Macdonald ......................... 303/119
4,488,477 12/1984 Miyamoto ......................... 60/545 X
4,557,527 12/1985 Stumpe ................................. 303/15
4,629,039 12/1986 Imoto et al. .................... 303/113 X
4,653,815 3/1987 Agarwal et al. ................ 303/113 X Primary Examiner—Douglas C. Butler
Attorney, Agent, or Firm—Edwin E. Greigg

[57] ABSTRACT

A brake pressure booster for vehicle brake systems, which can also be used to realize anti-skid functions, including a displaceable element, in the form of a permanent magnet, disposed in a pressure chamber and acted upon indirectly by the master brake cylinder to apply pressure to a brake fluid communicating with a wheel brake cylinder. The pressure chamber is embodied such that with increasing or decreasing brake pressure of the master brake cylinder, a transfer storage of potential energy that simultaneously increases in one or the other direction takes place, whereby it becomes possible to raise or lower the pressure of the wheel brake cylinders in the manner of boosting. Furthermore, by providing an electrical exciter coil, influence can also be exerted upon the boosting action of the brake pressure booster by an additional influence upon a magnetic position in order to generate anti-skid functions.

15 Claims, 5 Drawing Figures

BRAKE PRESSURE BOOSTER IN VEHICLE BRAKE SYSTEMS

BACKGROUND OF THE INVENTION

The invention is based on a brake pressure booster for vehicle brake systems. Hydraulic brake systems, having multi-circuit tandem master brake cylinders, are known (German Offenlegungsschrift No. 27 23 734); it is also known to provide such brake systems with anti-skid braking (ABS) functions, for example incorporating electrically actuatable multi-position magnetic valves, which realize the desired and necessary anti-skid control functions, in the outgoing brake pressure lines leading to the wheel brake cylinders. If there is a pressure drop, these magnetic valves close the particular pressure line from the master brake cylinder to the associated wheel brake cylinders and if needed deliver pressure fluid to the return system. If a renewed pressure rise is desired, then communication with the master brake cylinder is reestablished, along with arbitrary pressure/time courses, and with the option of keeping pressure unchanged, without either a rise or a drop as well. The prerequisite in such vehicle brake systems is always the availability of an energy source, which furnishes the brake fluid to the master brake cylinder at high pressure, so that after pressure, so that after the braking effect to be attained has been specified, this brake fluid can be fed into the pressure lines leading to the wheel brake cylinders. A separate energy source of this kind, which typically is a pump that includes an electric motor for driving the pump and appropriate pressure switches, is also required for anti-skid functions, because with the electrically actuatable multi-position magnetic valves of the prior art, brake medium or brake fluid that is under pressure is practically "lost" and must be pumped back up again later to the high pressure required for the braking process. In realizing anti-skid functions, it is also necessary to design such systems, which effect an interruption of the brake lines and an outflow of the pressure fluid in the brake lines, very reliably and in a fail-safe manner, so that if a failure occurs there will be no danger that too much high-pressure brake fluid will be drained out or that it will no longer be at all possible to furnish brake fluid to the wheel brake cylinders.

In the field of realizing anti-skid functions, it is also known (U.S. Pat. Nos. 3,690,736 and 3,371,979) to attach a parallel branch in the lines leading from the master brake cylinder to the various wheel brake cylinders, and to connect this branch with a chamber which is variable, by means of an electrically actuatable cylinder-piston assembly, in accordance with the triggering of an actuating coil counter to the pressure of a spring, so that a volume of pressure can be removed from and then returned to the brake line again; this is known as the basic plunger principle. In this case, although the brake circuit again remains closed, means are still required for interrupting the further delivery of high-pressure brake pressure fluid from the master brake cylinder during anti-skid functions, so that the removal of pressure fluid can become at all operative from the variable chamber to the wheel brake cylinders. This interruption can also be made possible by providing (U.S. Pat. No. 3,690,736) that the retreating piston simultaneously liberates a ball valve so as to close the master brake cylinder feed line. However, if the system fails at this point, then it is no longer possible to generate any braking pressure at all from the master brake cylinder, that is, by actuating the brake pedal.

OBJECT AND SUMMARY OF THE INVENTION

It is accordingly an object of the present invention to devise a brake booster of compact design which comprises only a few parts and does not need an external energy source, for example for building up excessively high brake pressure to the wheel brake cylinders, and which at the same time is designed such that with only a few additional means, this brake booster can also realize desired ABS function courses, yet without interrupting or separating the brake lines to the wheel brake cylinders.

The invention attains this object by means of the novel characteristics and has an advantage that by application of a principle of merely transferring storage of potential energy for generating braking pressure while at the same time having a simple and sturdy construction, a brake pressure booster can be furnished which is not only more reliable but also more economical and which is capable of generating high pressures as well and has the particular advantage that with few additional means, namely in the preferred exemplary embodiment by providing an electrical exciter coil, effective pressure modulation is attainable both for the simultaneous realization of anti-skid functions by the brake booster according to the invention and for its use in so-called anti-drive-slip, or anti-slip, regulation (ASR), or in other words whenever it is necessary to brake wheels individually, to prevent wheel spinning.

Since the brake booster according to the invention does not need any external energy source, it is less expensive, more reliable and safer than conventional brake boosters; because only a few parts are used, it can be manufactured simply with a simple construction and therefore needs little servicing, has a compact design and is hardly subject to malfunctioning.

With the particularly simple and inexpensive possibility of expansion to realize anti-skid pressure modulations, an embodiment becomes possible that has so-called "integrated ABS" or "integrated anti-skid", with the anti-skid design being suitable for anti-slip regulation as well, at no additional expense.

A further advantage of the present invention is that to realize anti-skid functions, only a small pressure modulation energy requirement is needed, because the pressure of the brake fluid is modulated prior to the boosting; the boosting cannot be exhausted and is operative even when the motor is stopped.

The characteristics recited enable advantageous further development and improvement of the brake booster defined herein. A particularly advantageous feature is the use of mutually attracting permanent magnets in the pressure chamber of the brake booster for transferring storage of existing potential energy, so that this energy is either present at the wheel brake cylinders in the form of boosted brake fluid pressure or is in the form of a predetermined travel distance between two magnets in the brake booster.

The invention will be better understood and further objects and advantages thereof will become more apparent from the ensuing detailed description of preferred embodiments taken in conjunction with the drawings.

DESCRIPTION OF THE PREFERRED EMBODIMENTS

The basic concept of the present invention is to generate a predetermined, boosted brake pressure at the wheel brake cylinders as a function of brake pressure initiated for instance by arbitrary actuation of a brake pedal, by means of making use of the principle of transfer of storage of potential energy, or more specifically, by forming a spacing between two permanent magnets, a high potential energy is produced, which in the course of increasing induction of brake pressure is converted into brake fluid pressure potential energy at the wheel brake cylinder, and vice versa, with the further possibility of additionally influencing the permanent magnet movement by means of electrical exciter coils so as to realize anti-skid and anti-slip regulation functions.

Figure 1:
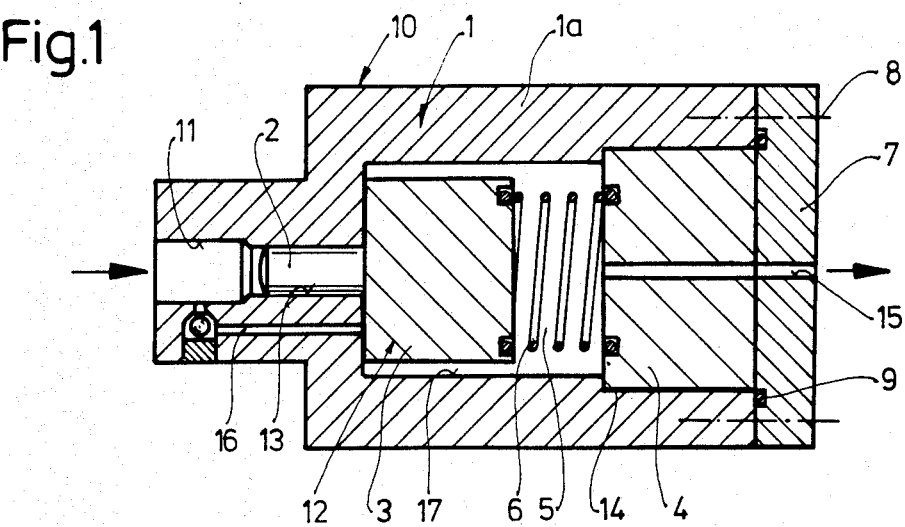
FIG. 1 shows a first exemplary embodiment of a magnetic pressure booster, in longitudinal section.

The system shown in FIG. 1 may be generally called a magnetic pressure booster, and it can be used for various purposes of increasing the pressure of a desired medium; if the medium is a brake fluid, then in the brake pressure booster shown at 10 in FIG. 1 this fluid is delivered to an inlet connection 11 so that the brake pressure from the master brake cylinder is present at this inlet. The brake pressure booster 10 has a housing 1, in which is formed an internal pressure chamber 5 in which a movable first permanent magnet 3 is disposed, and to which is connected a piston or plunger 2, guided in a slidably displaceable manner in a cylinder guide 13 which is of smaller diameter than the inlet 11, the first permanent magnet 3 is firmly connected to the plunger 2 and is movable with the plunger. As shown, the permanent magnet 3 is spaced from the wall 17 by a small spacing.

The housing 1 is preferably cylindrical with the chamber 5 having an open end which is closed off by a cap 7, for example by means of screws or bolts represented at 8. Sealing against fluid loss to the outside can be effected by means of an O ring 9 set into an annular recess in the cap. A second permanent magnet 4 is also received in the chamber 1a of the housing 1 and is preferably fixed in place by an annular shoulder stop 14. The two permanent magnets may be made of the same highly active materials such as neodymium or samarium cobalt having a high coercive force and are assembled with opposite polarity toward each other so that there is an attraction of permanent magnet 3 toward permanent magnet 4. A pre-stressed spring 6 keeps the two permanent magnets 3 and 4 apart, whenever an equal brake fluid pressure prevails at the inlet 11 and outlet 15. The outlet is formed in the exemplary embodiment of FIG. 1 by a bore extending through the stationary permanent magnet 4 and the closure cap 7.

Finally, a bypass line 16 is provided, which bypasses the sealed-off sliding guide of the plunger in the cylinder bore 13 and has an interposed check valve 12.

The result, then, is the following basic function of the brake pressure booster shown in FIG. 1:

The master brake cylinder pressure present at the inlet produced by operation of the foot pedal exerts a force on the plunger or piston 2, which is firmly connected to the very strong permanent magnet 3. The permanent magnet 3 then applies a pressure on the brake fluid in chamber 5 and moves closer to permanent magnet 4 due to the attraction by the stationary, and equally strong, permanent magnet 4. The pressure chamber 5 in which the permanent magnet 3 moves, and which is filled with brake fluid, communicates via the outlet connection 15 with a particular wheel brake cylinder connected to the outlet 15.

Let it first be assumed that when the brakes are not applied that the force of attraction between the two permanent magnets 3 and 4 is zero. Then if the brake is applied, brake pressure is raised from the master brake cylinder to the inlet 11 which applies a force on the plunger 2 and likewise on permanent magnet 3. As permanent magnet 3 moves in chamber 5, fluid pressure in chamber 5 builds up, this pressure is equally large as the corresponding pressure building up in the wheel brake cylinder connected to the outlet 15, because the pressure chamber 5 undergoes a reduction of volume as a result of the permanent magnet 3 moving farther into it. As the permanent magnet 3 moves into the cylinder 5 the magnet 3 becomes closer to magnet 4 and is attracted toward magnet 4. As a result of the force of attraction existing between the two permanent magnets 3 and 4, the magnet 3 moves toward magnet 4 and the pressure in the wheel brake cylinder becomes higher than the pressure in the master brake cylinder due to the attraction, the higher pressure depends on how much more the permanent magnet 3 is moved toward the permanent magnet 4, because the decreasing distance between the permanent magnets increases the force of attraction between the permanent magnets which in turn requires less pressure from the master brake cylinder. Furthermore, the more the permanent magnet 3 moves toward the permanent magnet 4, the greater is the volume of pressure fluid positively displaced out of the pressure chamber 5, and the greater is the pressure present both in the wheel brake cylinder and in the pressure chamber 5. The force of attraction between the permanent magnets 3 and 4 thus effects an increasingly greater rise in braking force, which can be substantially selected and predetermined by selecting the strength of the permanent magnets 3 and 4 and by selecting corresponding dimensions. When the brake fluid pressure at the inlet 11 is relieved by release of the brake pedal, the fluid pressure in the brake line to the wheel cylinder aided by the pre-stressed spring 6 forces the permanent magnet 3 away from permanent magnet 4 to relieve the braking action.

Figure 2:
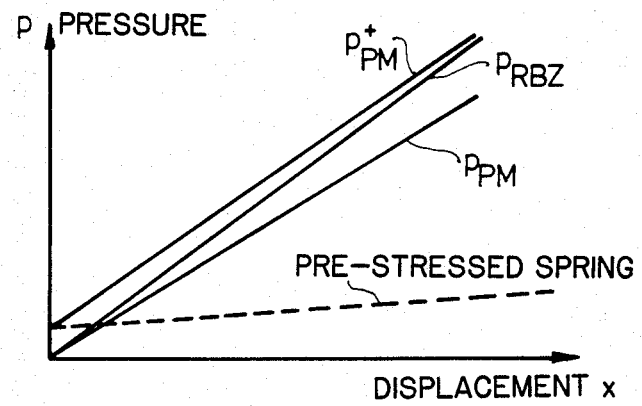
FIG. 2, in the form of a diagram, shows pressure courses plotted over the displacement of the movable element in the brake booster.

In accordance with the pressure courses shown in FIG. 2, the principle of the adaptation or design of the permanent magnets, or in other words of their strength, with respect to the desired boosting factor can now be understood. In the diagram of FIG. 2, the displacement of the permanent magnet 3 toward the permanent magnet 4 is indicated by x, while the force applied by the pre-stressed spring between the two permanent magnets 3 and 4 is shown as a curve drawn in broken lines, depending on its amount; in fact, the algebraic sign (+ or —) of the spring force applied is the opposite of that of the magnetic force developed. The symbol $P+_{PM}$ indicates the force between the permanent magnet 3 and the permanent magnet 4 as a course over the displacement distance x, divided by the end surface area of the plunger 2 to which the fluid pressure is applied by the master brake cylinder; $P_{PM}$ indicates the force between the permanent magnet 3 and the permanent magnet 4 minus the spring force that acts upon the permanent magnets 3 and 4, divided by the surface area of the plunger 2; and $P_{RBZ}$ represents the pressure characteristic curve of the wheel brake cylinder.

The difference between the characteristic curve courses $P_{RBZ}$ and $P_{PM}$ must be brought to bear by the master brake cylinder; the closer the curves $P_{RBZ}$ and $P_{PM}$ approach one another, the higher the boosting factor is.

The check valve 12 also shown in FIG. 1 and disposed in the bypass line 16 serves to compensate for a possible loss of brake fluid in the wheel brake cylinder, because of the possiblity of drawing more pressure fluid from the master brake cylinder.

Figure 3:
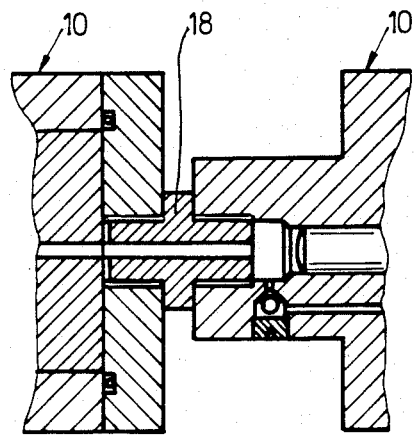
FIG. 3 illustrates the possibility of connecting brake boosters in series, on a magnetic basis.

FIG. 3 shows that by means of a simple adaptation member or fitting 18 disposed between the outlet connection and inlet connection of a following like brake booster, a series circuit of pressure boosters is also possible, which are then preferably all of the same design, thereby making it possible to raise the boosting factor.

Figure 4:
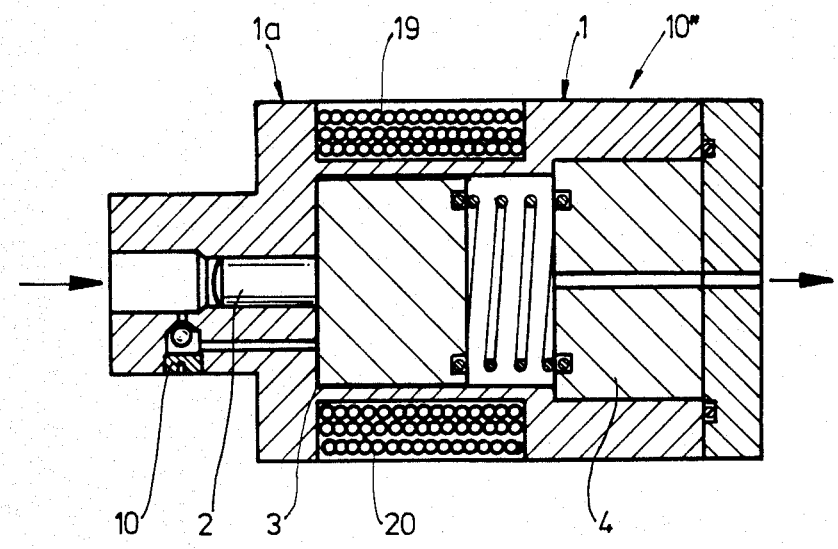
FIG. 4 illustrates the use of a brake pressure booster having an additional electrical exciter coil for pressure modulation for anti-skid and anti-slip regulation.

Finally, FIG. 4 shows that while maintaining the above-described structure of a brake pressure booster practically unchanged, it is also possible by additionally providing an electrical exciter coil 19, oriented toward the position of the movable permanent magnet 3, to realize a pressure modulation of the wheel brake pressure as well, so as to attain anti-skid functions and finally even anti-slip regulation functions. The exciter coil 19 acting upon the permanent magnet 3 can be disposed in an outer annular recess 20, hollowed out by turning, of the cylindrical housing part 1a, and by means of an appropriately dimensioned and adapted current in the coil 19, a force can be exerted upon the position of the permanent magnet 3 so as to shift permanent magnet 3. It is therefore possible, beginning with the pressure that corresponds to the pressure in the master brake cylinder, to drop the pressure prevailing in the wheel brake cylinder accordingly, because the permanent magnet is moved back again, toward the left in the plane of FIG. 4, by means of the electromagnetic force applied by the electrical coil 19, thereby attaining an increase in volume in the area of the wheel brake cylinder which relieves the braking action. It will be understood that by this means any desired pressure courses, including those of continuous transition and not having the abrupt variations typical when magnetic valves switch over, can be attained.

It is also similarly possible, by reversal of the direction of the supply current to the electrical coil 19, to raise the pressure in the wheel brake cylinder independently of the pressure of the master brake cylinder that prevails at the inlet connection, so that a predetermined wheel can also be selectively braked whenever the brake pedal is not actuated; the possibility of this kind of braking intervention is significant in anti-drive-slip regulation.

The check valve 12 shown in FIG. 1 is embodied as a ball valve, with the ball pre-stressed by a spring, not shown for simplification of the drawing. By means of this spring, the ball is pressed onto its seat, with such a predetermined force that upon braking, no brake fluid can initially flow directly from the connection of the master brake cylinder via the check valve into the pressure chamber 5 and thereby hinder the displacement of the permanent magnet 3. If the pressure in the pressure chamber 5 should at some time be higher than the pressure in the master brake cylinder, then the check valve 12 is pre-stressed in the blocking direction in any event.

Figure 5:
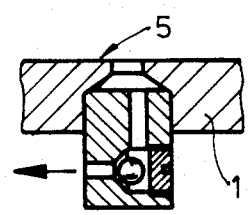
FIG. 5, in greater detail, shows a possible embodiment of a check valve which directly connects the pressure chamber to the brake fluid container.

Alternatively to the disposition of a check valve which connects the inlet connection 11 to the pressure chamber 5, it is possible as shown in part in FIG. 5 to dispose the check valve such that it connects the pressure chamber 5 directly with a brake fluid container, not shown; in that case, no spring is necessary in the check valve, because the valve is automatically closed by the contact of the valve ball with its seat because of the rise in pressure in the pressure chamber 5.

In summary, the invention is based on the principle of transferring storage of potential energy. In the unbraked condition, the permanent magnet 3 has a high potential energy as compared with the permanent magnet 4, while contrarily the brake fluid in the wheel brake cylinder and in the corresponding inflow lines has no potential energy. Upon actuation of the brake, the permanent magnet 3 loses potential energy, which is given up to the brake fluid in the wheel brake cylinder and in the inflow lines in the form of compression work. The brake fluid in the wheel brake cylinder thus stores this energy again in the form of potential energy. If the brake is then released again, then the brake fluid loses this potential energy, which is taken back up again by the permanent magnet 3 and converted into its own, re-stored potential energy, because of the increasing distance from the permanent magnet 4 that it gains. This is in contrast to the mode of operation of a conventional brake booster, in which potential energy stored up in the brake fluid in the wheel brake cylinder and in the inflow lines cannot be recovered during the expansion, so that the prior art type of brake booster requires an external energy source that functions as an auxiliary energy source. The magnetic pressure booster of the present invention does not require any energy source, because of the application of the principle of transfer storage of the potential energy, and all that it needs to replace are losses due to hysteresis.

All the characteristics shown in the drawing and found in the foregoing description and recited in the ensuing claims may be essential to the invention both individually and in any arbitrary combination with one another.

The foregoing relates to preferred exemplary embodiments of the invention, it being understood that other variants and embodiments thereof are possible within the spirit and scope of the invention, the latter being defined by the appended claims.

What is claimed and desired to be secured By Letters Patent of the United States is:

1. A brake pressure booster in vehicle brake systems, in combination with an anti-skid system for realizing anti-skid functions, which comprises a housing (1), a pressure chamber (5) in said housing, an inlet (11) in said housing to which a brake pressure from a master brake cylinder is connectable, an outlet (15) which is connectable with an associated wheel brake cylinder, a potential energy means (3) in said pressure chamber so embodied that with increasing or decreasing brake pressure from said master brake cylinder to said inlet, the storage of potential energy increasing simultaneously in one or another direction is transferred for raising or lowering pressure applied from said brake pressure booster to the wheel brake cylinder, wherein the booster includes a fixed permanent magnet (4) and said potential energy means is a moveable permanent magnet (3) having a varying distance with respect to said fixed permanent magnet (4) and which is displaceably supported in said pressure chamber (5).

2. A brake pressure booster as defined by claim 1, in which by means of the relative displaceability of said movable permanent magnet (3) with respect to said fixed permanent magnet (4), potential energy is transferred, upon an approach of said permanent magnet (3) toward said fixed permanent magnet (4), in the form of a brake fluid pressure increase in the area of the wheel brake cylinder, and upon the termination of a braking, by means of expansion and yielding of brake fluid pressure from the area of the wheel brake cylinder potential energy is restored into potential energy of said movable permanent magnet (3).

3. A brake pressure booster as defined by claim 2, which includes a plunger (2) supported in a slidably displaceable manner in a narrowed cylinder guide (13) in said inlet (11) of the housing, said plunger being exposed to brake fluid pressure coming from said master brake cylinder, and that said movable permanent magnet (3) located in said pressure chamber (5) is secured on said plunger (2) in such a way that with increasing pressure of the master brake cylinder said permanent magnet (3) is movable toward said fixed permanent magnet (4) thereby reducing the volume of said pressure chamber between said magnets resulting in a greater attraction of magnet (3) to magnet (4) whereby the fluid brake pressure at the wheel brake cylinder is increased, because of the force of attraction of the two magnets, as compared with the pressure of the master brake cylinder.

4. A brake pressure booster as defined by claim 1, which includes a plunger (2) supported in a slidably displaceable manner in a narrowed cylinder guide (13) in said inlet (11) of the housing, said plunger being exposed to brake fluid pressure coming from said master brake cylinder, and that said movable permanent magnet (3) located in said pressure chamber (5) is secured on said plunger (2) in such a way that with increasing pressure of the master brake cylinder said permanent magnet (3) is movable toward said fixed permanent magnet (4) thereby reducing the volume of said pressure chamber between said magnets resulting in a greater attraction of magnet (3) to magnet (4) whereby the fluid brake pressure at the wheel brake cylinder is increased, because of the force of attraction of the two magnets, as compared with the pressure of the master brake cylinder.

5. A brake pressure booster as defined by claim 4, in which said housing is cylindrical with an open end, with a circular-cylindrical inner bore (17), having a wall which forms said pressure chamber (5) and in which the movable permanent magnet (3) is disposed in a slidably displaceable manner, spaced apart from said wall of said chamber and said fixed permanent magnet (4) is held stationary in said chamber of said housing by means of a shoulder stop (14) and a cap (7) which closes off said chamber and a restoring spring (6) positioned between said permanent magnets (3 and 4).

6. A brake pressure booster as defined by claim 4, which includes a bypass line (16) disposed between the pressure chamber (5) and the inlet connection (11), said bypass line (16) containing a check valve (12) that prevents a return flow from the pressure chamber (5) to the inlet connection (11).

7. A brake pressure booster as defined by claim 4, which includes an electrical coil (19) adjoining the position of the movable permanent magnet (3) in the housing (1) and disposed in such a manner that depending on the direction of the current in said coil an additional magnetic exertion of force upon the movable permanent magnet (3) determines the position of the movable permanent magnet (3) and thus predetermines the pressure in the pressure chamber (5) and at the wheel brake cylinders thereby realizing arbitrary anti-skid and anti-slip functions.

8. A brake pressure booster as defined by claim 1, in which said housing is cylindrical with an open end, with a circular-cylindrical inner bore (17), having a wall which forms said pressure chamber (5) and in which the movable permanent magnet (3) is disposed in a slidably displaceable manner, spaced apart from said wall of said chamber and said fixed permanent magnet (4) is held stationary in said chamber of said housing by means of a shoulder stop (14) and a cap (7) which closes off said chamber and a restoring spring (6) positioned between said permanent magnets (3 and 4).

9. A brake pressure booster as defined by claim 8, which includes a bypass line (16) disposed between the pressure chamber (5) and the inlet connection (11), said bypass line (16) containing a check valve (12) that prevents a return flow from the pressure chamber (5) to the inlet connection (11).

10. A brake pressure booster as defined by claim 8, which includes an electrical coil (19) adjoining the position of the movable permanent magnet (3) in the housing (1) and disposed in such a manner that depending on the direction of the current in said coil an additional magnetic exertion of force upon the movable permanent magnet (3) determines the position of the movable permanent magnet (3) and thus predetermines the pressure in the pressure chamber (5) and at the wheel brake cylinders thereby realizing arbitrary anti-skid and anti-slip functions.

11. A brake pressure booster as defined by claim 1, which includes a bypass line (16) disposed between the pressure chamber (5) and the inlet connection (11), said bypass line (16) containing a check valve (12) that prevents a return flow from the pressure chamber (5) to the inlet connection (11).

12. A brake pressure booster as defined by claim 11, which includes an electrical coil (19) adjoining the position of the movable permanent magnet (3) in the housing (1) and disposed in such a manner that depending on the direction of the current in said coil an additional magnetic exertion of force upon the movable permanent magnet (3) determines the position of the movable permanent magnet (3) and thus predetermines the pressure in the pressure chamber (5) and at the wheel brake cylinders thereby realizing arbitrary anti-skid and anti-slip functions.

13. A brake booster as defined by claim 1, in which a plurality of brake pressure boosters are connected in series to increase the boosting factor.

14. A brake pressure booster as defined by claim 1, which includes an electrical coil (19) adjoining the position of the movable permanent magnet (3) in the housing (1) and disposed in such a manner that depending on the direction of the current in said coil an additional magnetic exertion of force upon the movable permanent magnet (3) determines the position of the movable permanent magnet (3) and thus predetermines the pressure in the pressure chamber (5) and at the wheel brake cylinders thereby realizing arbitrary anti-skid and anti-slip functions.

15. A brake pressure booster as defined by claim 1, in which the pressure chamber (5) communicates via a check valve with a brake fluid container.

* * * * *